United States Patent [19]

Sobral

[11] Patent Number: 5,797,521
[45] Date of Patent: Aug. 25, 1998

[54] DISPENSING CAP FOR VACUUM BOTTLES

[75] Inventor: João Fernando Sobral, São Paulo, Brazil

[73] Assignee: Sobral Invicta S.A., São Paulo-SP, Brazil

[21] Appl. No.: 619,577

[22] PCT Filed: Sep. 28, 1995

[86] PCT No.: PCT/BR95/00042

§ 371 Date: Mar. 22, 1996

§ 102(e) Date: Mar. 22, 1996

[87] PCT Pub. No.: WO96/15705

PCT Pub. Date: May 30, 1996

[30] Foreign Application Priority Data

Nov. 24, 1994 [BR] Brazil ............... 9404733

[51] Int. Cl.⁶ ............................................. B67D 3/00
[52] U.S. Cl. .......................... 222/531; 222/534; 222/484
[58] Field of Search ................... 222/531, 532, 222/528, 537, 556, 566, 534, 536, 538, 484

[56] References Cited

U.S. PATENT DOCUMENTS

| | | |
|---|---|---|
| 2,971,664 | 2/1961 | Jacob . |
| 2,979,238 | 4/1961 | Bramming . |
| 3,776,428 | 12/1973 | Hazard . |
| 3,957,181 | 5/1976 | Hazard . |
| 4,015,756 | 4/1977 | Beck . |
| 4,282,991 | 8/1981 | Hazard . |
| 4,998,649 | 3/1991 | Thanisch ................ 222/536 X |

*Primary Examiner*—Gregory L. Huson
*Attorney, Agent, or Firm*—Darby & Darby

[57] ABSTRACT

A dispensing cap for vacuum bottles including a cap body in the form of an inverted glass coupled to the nozzle of the vacuum bottle and having a liquid discharge axial opening, an annular gasket mounted at the upper part of the cap body around the liquid discharge axial opening and defining a concave-spherical surface portion, and a spout having an inlet end in the form of spherical surface portion constantly tightly seated against the annular gasket and an outlet end maintained in communication with the inlet end through an axial throughbore, the spout being tiltable around an axis orthogonal to the longitudinal axis of the vacuum bottle between a closed position in which the spherical surface portion of the inlet end seals the liquid discharge axial opening and an open position in which the outlet end is spaced away from the cap body and the inlet end maintains the axial throughbore in direct fluid communication with the liquid discharge axial opening. The dispensing cap further includes a support member mounted onto the cap body in an axially locked but freely rotating manner around the axis of the liquid discharge axial opening, the spout being articulated to the support member around the axis orthogonal to the longitudinal axis of the vacuum bottle so that it may rotate with the support member and tilt between its closed and open positions maintaining the spherical surface portion of its inlet end constantly seated against the annular gasket.

6 Claims, 4 Drawing Sheets

5,797,521

1

DISPENSING CAP FOR VACUUM BOTTLES

FIELD OF THE INVENTION

The present invention refers to a dispensing cap for vacuum bottles, which is provided with a tiltable spout moving around an axis orthogonal to the longitudinal axis of the vacuum bottle.

The dispensing caps for vacuum bottles are already known and have been widely used for a long time, due to their practicability, since they need not be totally removed to allow the liquid to be poured from the bottle, thereby contributing to maintain the temperature of the stored liquid for a substantially long period of time.

BACKGROUND OF THE INVENTION

A known dispensing cap usually comprises a single body, which is threaded to the nozzle of the vacuum bottle and which presents a liquid discharge axial opening. On said single body there is articulated a spout, provided with an inlet end and an outlet end, which are maintained in communication by an axial throughbore. The spout inlet end is in the form of a spherical surface portion, which is seated on a concave annular gasket mounted at the upper part of the cap and around the liquid discharge axial opening. The spout is tiltable around an axis orthogonal to the longitudinal axis of the bottle, between a closed position in which the spout inlet end is kept seated on the annular gasket, in order to seal the liquid discharge axial opening, and an open position in which the spout outlet end is displaced away from the cap body and the spout inlet end maintains the axial throughbore in direct fluid communication with the liquid discharge axial opening, whereas the spout inlet end is kept seated against the annular gasket. Thus, in the open position, the axial throughbore of the spout defines a channel that allows the liquid to be poured from the inside of the vacuum bottle.

Although the prior art dispensing cap allows the liquid contained inside the bottle to be poured through the tiltable spout, it has the inconvenience that the alignment of the spout need to be defined by the adequate tightening of the cap onto the bottle. For this purpose, the threads of the bottle and cap are dimensioned in such a way that, at the end of the cap threading, the spout outlet end is aligned diametrically opposite to the handle of the vacuum bottle, permitting the latter to be comfortably used. Nevertheless, the heat as well as the successive tightenings made to close the bottle may cause thermal and mechanical deformations in the sealing means, which upon deforming cause a progressive angular displacement of the tightening point of the cap, resulting in an increasingly higher misalignment between the spout and the bottle handle, making troublesome the handling of said bottle.

DISCLOSURE OF THE INVENTION

Thus, it is an object of the present invention to provide a dispensing cap for vacuum bottles, whose spout can be aligned with the bottle handle independently of the tightening degree of the cap onto said bottle.

This and other objectives and advantages of the present invention are attained through the provision of a dispensing cap for vacuum bottles of the above mentioned type, comprising a support member, mounted onto the cap body in an axially locked but freely rotating manner around the axis of the liquid discharge axial opening, the spout being articulated to the support member around said axis orthogonal to the longitudinal axis of the vacuum bottle, so that it may rotate with said support member and tilt between its closed and open positions, maintaining the spherical surface portion of its inlet end constantly seated against the annular gasket.

In practical terms, the present dispensing cap has a high functional advantage, as compared with the known dispensing caps. Since its tiltable spout can rotate in 360° around the axial axis of the cap, independently of the angular position of the cap in relation to the bottle, said spout may be rotated towards an alignment position diametrically opposite to the bottle handle or towards any other desired position, assuring the adequate handling of the bottle.

BRIEF DESCRIPTION OF THE DRAWINGS

The invention will be described below, with reference to the attached drawings, in which.

BEST MODE FOR CARRYING OUT THE INVENTION

Figure 1:
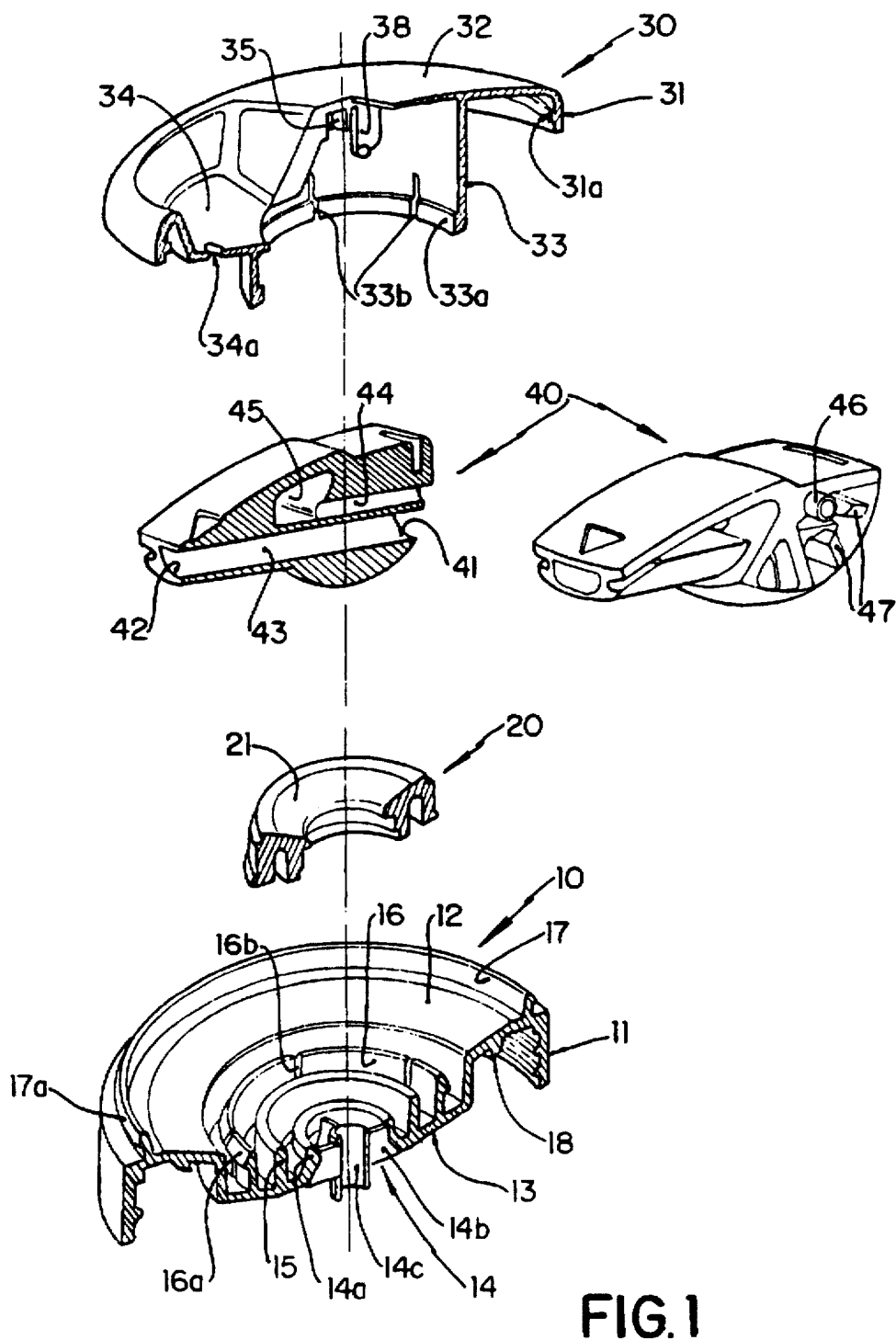
FIG. 1 is a partially cut exploded perspective view of the dispensing cap of the present invention.
Figure 2:
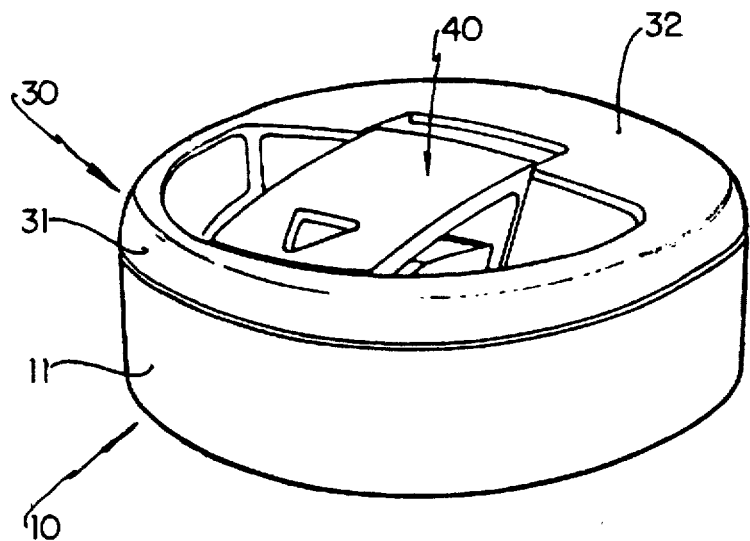
FIG. 2 is a front lateral perspective view of the same dispensing cap, with its spout in the closed position.

According to the figures described above, the dispensing cap for vacuum bottles of the present invention comprises a cap body 10 usually in the form of an inverted glass, incorporating a peripheral cylindrical skirt 11 which is internally threaded, so as to be adapted to the threaded upper nozzle of a vacuum bottle B.

The circular end wall 12 of the cap body 10 has a lowered median portion 13, whose center is provided with a liquid discharge axial opening 14, which in the illustrated embodiment is surrounded by a cylindrical tubular rib 14a incorporating radial fins 14b carrying a central axial tube portion 14c, which extends downwardly the lowered median portion 13 of the cap body 10.

The lowered median portion 13 of the cap body 10 further incorporates at its upper part a first cylindrical tubular projection 15, which is concentric and externally positioned in relation to the cylindrical tubular rib 14a, and a second cylindrical tubular projection 16, which is external and spaced from the first projection and provided with an upper enlargement forming an external peripheral tooth 16a. The second cylindrical tubular projection 16 is provided with a plurality of axial slots 16b which are angularly spaced from each other, allowing the upper enlargement of said second cylindrical tubular projection 16 to be radially displaced both inwardly and outwardly, by the elastic deformation of said second cylindrical tubular projection 16, in order to modify the circumferential positioning of the peripheral tooth 16a.

The circular end wall 12 of the cap body 10 further incorporates at its upper part a peripheral circular ridge 17, which is inwardly radially displaced in relation to the peripheral edge of said end wall 12 and which is provided with an end enlargement defining a small external peripheral tooth 17a. The end wall 12 further incorporates a small lower peripheral projection 18 which is inwardly radially displaced in relation to the skirt 11 of the cap body 10.

Over the tubular rib 14a and the first cylindrical tubular projection 15 there is adapted an annular gasket 20, with its annular upper face surrounding the liquid discharge axial opening 14 and defining a concave-spherical surface portion 21.

Onto the cap body 10 there is provided a calotte 30, which has a small peripheral skirt 31 dependent from a circular end wall 32, which has a convex top and incorporates at its lower part a cylindrical tubular wall 33, which is concentric and radially internal to the small peripheral skirt 31 and which is further provided with an end enlargement defining an internal peripheral tooth 33a and with a plurality of flexibilizing axial slots 33b. Similarly, the small skirt 31 is provided with an end enlargement defining a peripheral internal tooth 31a.

The dimensioning of the small skirt 31 is made so that its free edge is seated onto the peripheral edge of the end wall 12 of the cap body 10, while both the external peripheral tooth 17a of the peripheral circular ridge 17 and the internal peripheral tooth 31a of said small skirt 31 are maintained mutually engaged, guaranteeing the axial retention of the calotte onto the cap body 10 and permitting the calotte 30 to rotate freely around the axis of the liquid discharge axial opening 14. The calotte 30 is also axially retained against the cap body 10 through the mutual engagement of the external peripheral tooth 16a of the second projection 16 and the internal peripheral tooth 33a of the cylindrical tubular wall 33.

In the calotte 30, the eccentric median portion of its circular end wall 32 is removed and partially substituted by a lowered wall portion 34, which is provided with a drain hole 34a and which defines a housing having a pair of windows 35, diametrically opposite and contained in a plane that also contains the axis of the liquid discharge axial opening 14.

Inside the calotte 30, there is mounted a spout 40 having an inlet end 41 in the form of a spherical surface portion, which is tightly seated on the concave-spherical face of the annular gasket 20, and an outlet end 42 in the form of a "duck's beak".

Both the inlet end 41 and the outlet end 42 of the spout are maintained in communication through an axial throughbore 43, there being also provided an air vent 44 communicating the inlet end 41 with a median transversal bore 45 opening towards a pair of lateral faces of the spout.

The spout 40 incorporates a pair of small opposite lateral shafts 46 fitted into the diametrically opposite windows 35 of the calotte 30, so that said spout 40 can tilt between a closed position in which the spherical surface portion of the inlet end 41 of the spout 40 seals the liquid discharge axial opening 14, and an open position in which the outlet end 42 of the spout 40 is spaced away from the cap body 10 and the inlet end 41 of the spout maintains the axial throughbore 43 in direct fluid communication with the liquid discharge axial opening 14.

The spout 40 further comprises, in each of its opposite lateral faces, a pair of ribs 47 which, upon the tilting of the spout 40, will press respective flexible blades 38 internally incorporated in the calotte 30, producing a noise that will inform the user when the spout has reached its "closed" and "open" limit operating positions.

Figure 3:
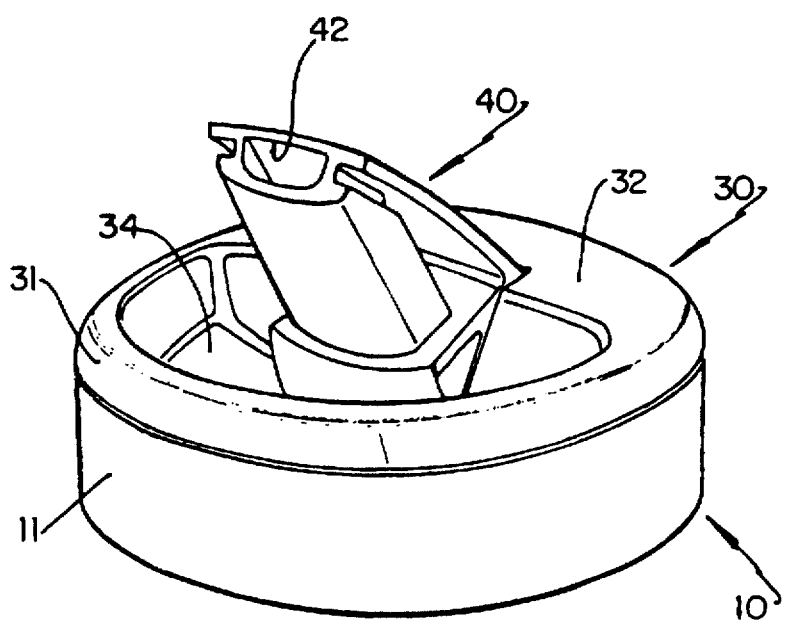
FIG. 3 is a similar view to that of FIG. 2, but with the spout in the open position.
Figure 4:
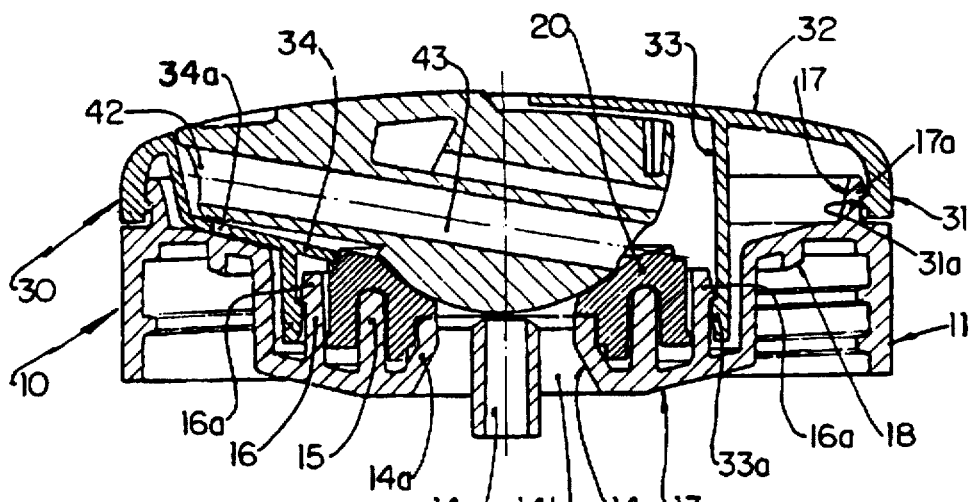
FIG. 4 is a diametrical section view of the same cap, with its spout in the closed position.
Figure 5:
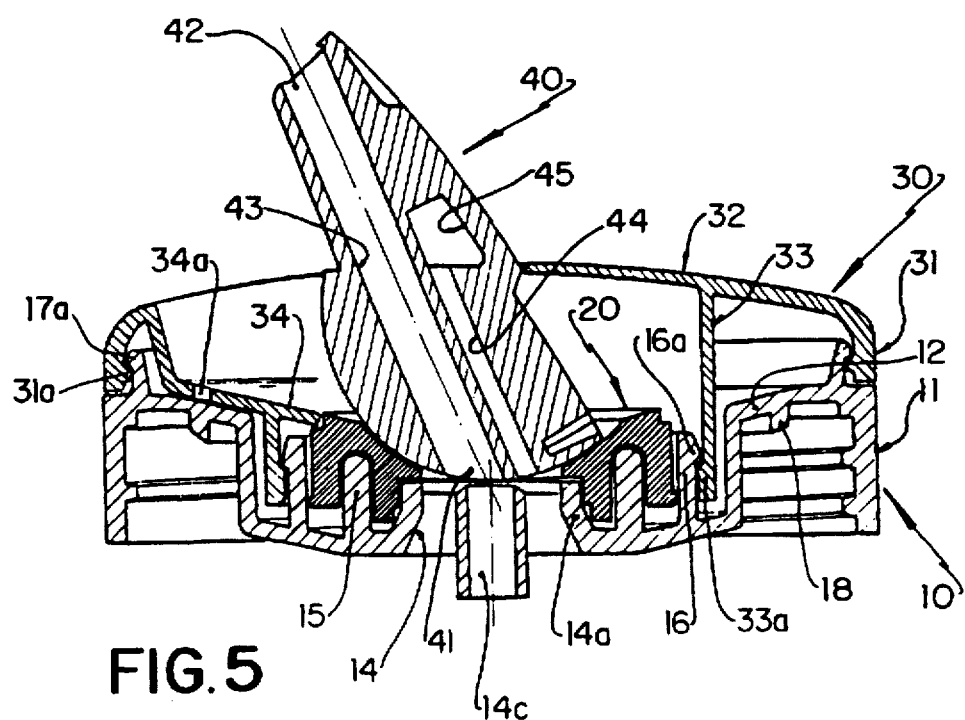
FIG. 5 is a similar view to that of FIG. 4, but with the spout in the open position.
Figure 6:
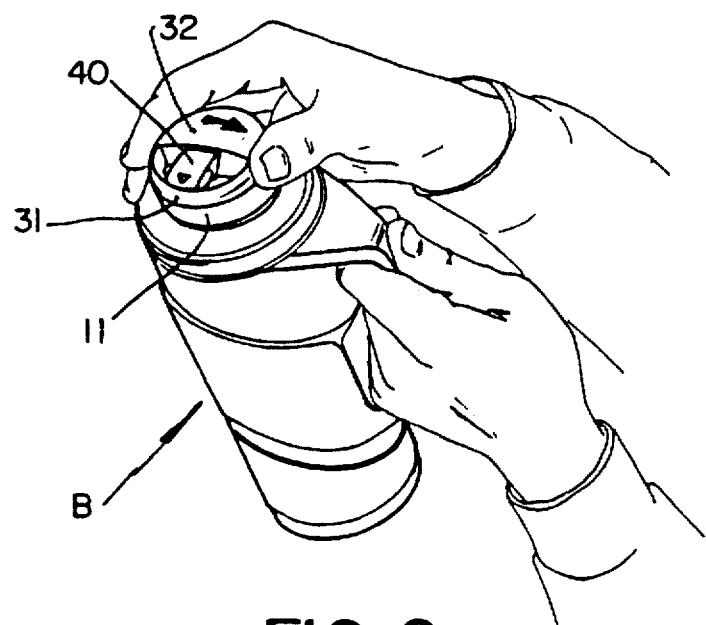
FIG. 6 is a perspective view of a vacuum bottle provided with the present dispensing cap, with the spout being manually rotated to a position chosen by the user.
Figure 7:
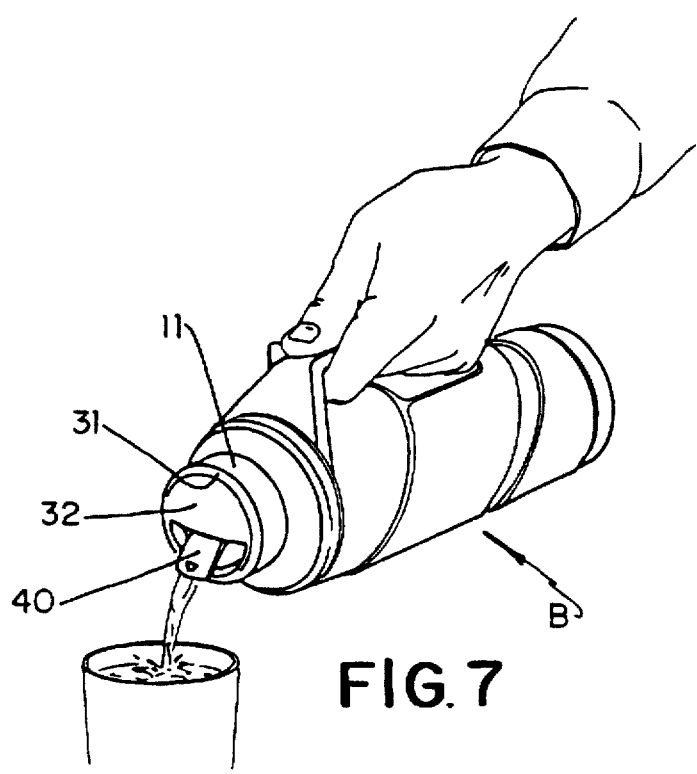
FIG. 7 is a similar view to that of FIG. 6, with the vacuum bottle in its operating condition.

When the user wants to serve the beverage contained inside the bottle B, he rotates the calotte 30, in order to choose the best operating position (see FIG. 6) and then he tilts the spout 40 upwardly, by using the free spacings defined on the lowered wall portion 34 of the calotte on both sides of the spout 40, in such a way that the user's fingers do not touch the point for the liquid discharge. With the spout in the raised open position (FIGS. 3 and 5), both the axial throughbore 43 and the air vent 44 are now in communication with the liquid discharge axial opening 14, thus permitting the liquid to be poured out, as illustrated in FIG. 7.

Due to the axial air vent 44 provided in the spout 40, there is a permanent admission of atmospheric air to the inside of bottle B during the liquid discharge, in order that the poured flow be constant and uniform.

I claim:

1. A dispensing cap for vacuum bottles, comprising a cap body (10) in the form of an inverted glass, which is coupled to the nozzle of the vacuum bottle (B) and which has a liquid discharge axial opening (14); an annular gasket (20), which is mounted at the upper part of the cap body (10) around the liquid discharge axial opening (14) and which defines a concave-spherical surface portion; and a spout (40) having an end inlet (41) in the form of a spherical surface portion which is constantly tightly seated against the annular gasket (20), and an outlet end (42) maintained in communication with the inlet end (41) through an axial throughbore (43), the spout (40) being tiltable around an axis orthogonal to the longitudinal axis of the vacuum bottle (B) between a closed position, in which the spherical surface portion of the inlet end (41) of the spout (40) seals the liquid discharge axial opening (14) and an open position, in which the outlet end (42) of the spout (40) is spaced away from the cap body and the end inlet (41) of the spout maintains the axial throughbore (43) in direct fluid communication with the liquid discharge axial opening (14), said dispensing cap being characterized in that it further comprises a support member (30) mounted onto the cap body (10) in an axially locked but freely rotating manner around the axis of the liquid discharge axial opening (14), the spout (40) being articulated to the support member (30) around said axis orthogonal to the longitudinal axis of the vacuum bottle, so that it may rotate with said support member and tilt between its closed and open positions, maintaining the spherical surface portion of its inlet end (41) constantly seated against the annular gasket (20).

2. Cap, as in claim 1, characterized in that the support member (30) comprises a calotte having an end wall (32) incorporating at its lower part at least one concentric tubular projection (31, 33) which is seated and restrained from axial displacement in relation to the cap body (10).

3. Cap, as in claim 2, characterized in that the end wall (32) of the calotte (30) incorporates two concentric cylindrical lower tubular projections (31, 33), each one provided with an end peripheral tooth (31a, 33a) that engages with an end peripheral tooth (17a, 16a) provided in a respective cylindrical upper tubular projection (17, 16) of the cap body (10).

4. Cap, as in claim 3, characterized in that one of the lower tubular projections of the end wall (32) of the calotte (30) is in the form of a small peripheral skirt (31) with its free edge being seated against the peripheral edge of the cap body (10), the other lower tubular projection being in the form of a cylindrical tubular wall (33) which is more internally located and provided with axial slots (33b).

5. Cap, as in claim 2, characterized in that the end wall (32) of the calotte (30) presents an eccentric median portion that is eliminated and partially substituted by a lowered wall portion (34) defining a housing to allow the mounting of the spout (40).

6. Cap, as in claim 5, characterized in that the housing for mounting the spout (40) inside the calotte (30) has a width that is substantially larger than that of the spout (40), in order to define on both sides of the latter, when in the closed position, respective spacings to allow the introduction of the user's fingers.

* * * * *